United States Patent [19]
Foster et al.

[11] 3,856,737
[45] Dec. 24, 1974

[54] SURGICAL CEMENTS OF IMPROVED COMPRESSIVE STRENGTH CONTAINING STANNOUS FLOURIDE AND POLYACRYLIC ACID

[75] Inventors: John Foster; Ernest Henry, both of London, England

[73] Assignee: The Amalgamated Dental Company, Limited, London, England

[22] Filed: Jan. 16, 1973

[21] Appl. No.: 324,225

[30] Foreign Application Priority Data
Jan. 14, 1972  Great Britain ................ 1899/72

[52] U.S. Cl. ............... 260/29.6 M, 106/35, 32/15
[51] Int. Cl. ....... C08f 29/34, A61k 5/00, A61k 5/02
[58] Field of Search ............. 260/29.6 M; 106/35; 75/178 T; 32/15

[56] References Cited
UNITED STATES PATENTS
3,655,605  4/1972  Smith .................................. 106/35
3,676,112  5/1970  Muhler ................................. 32/15

FOREIGN PATENTS OR APPLICATIONS
2,039,185  3/1971  Germany
1,235,668  6/1971  Great Britain
966,278   12/1951  Germany OTHER PUBLICATIONS
"Fluoride Uptake by Enamel . . .," Wei, Sierk – Journal of American Dental Ass., Vol. 83, 1971.
"Tin in Dentistry," – Evans – Tin and its Uses, No. 91, 1972.

Primary Examiner—Howard E. Schain
Assistant Examiner—Peter F. Kulkosky
Attorney, Agent, or Firm—Learman & McCulloch

[57] ABSTRACT

A pack for the preparation of a surgical cement comprises a solid component (a) comprising zinc oxide together with at least 2 percent by weight, based on the weight of zinc oxide, of stannous fluoride, and a liquid component (b) comprising an aqueous solution of polyacrylic acid. The surgical cement is prepared by mixing component (a) with component (b) suitably in a weight ratio of 0.05 -4 to 1.

6 Claims, No Drawings

SURGICAL CEMENTS OF IMPROVED COMPRESSIVE STRENGTH CONTAINING STANNOUS FLOURIDE AND POLYACRYLIC ACID

This invention relates to surgical cements of the so-called polycarboxylate type, which have special although not exclusive application in dentistry.

Cements of this type comprise essentially an aqueous polyacrylic acid and zinc oxide. Generally, the cement as manufactured and marketed comprises these ingredients in separate containers, associated together as a pack the ingredients being mixed together immediately before use to form a plastic mass which will harden rapidly. The polyacrylic acid, as will be recognised, accordingly constitutes a replacement for part or all of the phosphoric acid used in the conventional zinc phosphate cement.

It has already been proposed, in polycarboxylate cements of this kind, for example as described in British Pat. No. 1,139,430 to incorporate other metal salts or oxides, with specific reference to magnesium oxide, bismuth oxide, calcium phosphate and/or calcium fluoride.

It has now been found that the strength properties of the set cement are considerably increased by the incorporation of stannous fluoride in an amount of at least 2 percent by weight of the zinc oxide. Preferably, the stannous fluoride does not exceed 12 percent by weight of the zinc oxide, and an amount of from 5 to 10 percent by weight of the powder component of the cement has been found particularly suitable.

The effect of the stannous fluoride in the cement is highly specific. A number of other fluorides including calcium fluoride have been tested but do not have any comparable effect. Neither do the magnesium oxide, bismuth oxide or calcium phosphate mentioned in the prior art.

The invention further consists in a powder component suitable for mixing with aqueous polyacrylic acid to make a surgical cement, comprising zinc oxide and stannous fluoride in an amount of from 2 to 12 percent weight of the zinc oxide. The stannous fluoride preferably constitutes 5 to 10 percent by weight of the mixture.

As already mentioned, the surgical cement will normally be made available as a pack comprising on the one hand the zinc oxide powder component (incorporating the stannous fluoride according to the invention) and an aqueous polyacrylic acid. The latter as described in the above numbered Patent will normally contain at least 30 percent by weight of the polyacrylic acid having a viscosity-determined average molecular weight of 15,000 – 150,000. The pack will normally contain from ½ to 4 parts by weight of the zinc oxide component to 1 part of the aqueous polyacrylic acid.

Further, as already indicated, the zinc oxide component may incorporate a minor proportion of other metal salts or oxides, in addition to the tin fluoride. In this respect it resembles the powder component used in the production of conventional zinc phosphate cements, but (also as described in the above mentioned Patent), is preferably further deactivated by heating for example at about 1,000°C for up to 40 hours. The stannous fluoride may be incorporated before or after deactivating but will normally be incorporated afterwards.

The zinc oxide component may further incorporate part of the polyacrylic acid, in dry powder form. The balance of the polyacrylic acid will still be provided, in the complete cement, as an aqueous component, correspondingly more dilute in this case. It is found that the polyacrylic acid powder dissolves readily in the dilute aqueous polyacrylic acid under the conditions of high speed vibration normally employed for mixing dental cements and amalgams. Further, a polycarboxylate cement pack according to the invention may be provided as a two-compartment phial or capsule in which the components may be mixed but kept out of mutual contact until mixing is required; a low initial viscosity of the liquid component is particularly desirable in the case of such packs, e.g. as described in our British Pat. No. 1,235,668.

In order that the invention may be well understood the following Examples are given by way of illustration only.

EXAMPLE 1

A polyacrylic acid solution having a viscosity average molecular weight of 70,000 and a concentration of 42 percent w/w was prepared by solution polymerisation of acrylic acid monomer using the method described in British Pat. No. 1,139,430.

A powder consisting of 100 parts zinc oxide, 15 parts magnesium oxide, 4 parts silica and 2 parts aluminium oxide was then fired to obtain a suitable reactivity. This was then blended with 8 percent w/w of stannous fluoride.

When mixed at a powder/liquid ratio of 0.95 gms/0.50 gms the components reacted to give the cement having a compressive strength of 970 kilograms per square centimeter and a diametral compression of 115 kilograms per square centimeter.

Without the addition of stannous fluoride to the powder the set cement had a compressive strength of 600 kilograms per square centimetre.

EXAMPLE 2

A liquid was prepared having the same characteristics as that detailed in Example 1. A powder was prepared as in Example 1 but was then blended with 10 percent w/w stannous fluoride.

The compressive strength of the set cement was found to be 1,260 kilograms per square centimeter and its diametral compression 145 kilograms per square centimeter.

EXAMPLE 3

A polyacrylic acid solution having a viscosity average molecular weight of 58,000 and a concentration of 35 percent w/w was prepared by the solution polymerisation of acrylic acid monomer using the method described in British Pat. No. 1,139,430.

A powder containing 8 percent w/w of stannous fluoride was prepared according to details described in Example 1.

When mixed at a powder/liquid ratio of 0.95 gms/0.50 gms the components reacted to give a cement having a compressive strength of 750 kilograms per square centimeter and a diametral compression of 88 kilograms per square centimeter.

Without the addition of stannous fluoride to the powder the set cement had a compressive strength of 500 kilograms per square centimeter and a diametral compression of 35 kilograms per square centimeter.

We claim:

1. A surgical cement consisting essentially of (a) zinc oxide together with from 5 to 10 percent by weight, based on the weight of said zinc oxide, of stannous fluoride, and (b) an aqueous solution of polyacrylic acid having a viscosity determined molecular weight of from 15,000 to 150,000; said cement comprising from 0.5 to 4 parts by weight of component (a) per part by weight of component (b).

2. The surgical cement according to claim 1 in which component (a) contains from 5 to 10 percent by weight of stannous fluoride.

3. The surgical cement according to claim 1 in which component (b) consists essentially of an aqueous solution containing at least 40 percent by weight of said polyacrylic acid.

4. The surgical cement according to claim 1 in which component (a) also contains a minor proportion of metal salt or oxide selected from the group consisting of magnesium oxide, silica, aluminum oxide, and mixtures thereof.

5. The surgical cement according to claim 1 in which the zinc oxide in component (a) has been deactivated by heating.

6. The surgical cement according to claim 5 in which the zinc oxide has been deactivated by heating at about 1,000°C. for up to 40 hours.

* * * * *